United States Patent
Zeira et al.

(10) Patent No.: US 6,885,649 B2
(45) Date of Patent: Apr. 26, 2005

(54) METHOD OF MULTIUSER DETECTION WITH USER EQUIPMENT

(75) Inventors: Ariela Zeira, Huntington, NY (US); Eldad Zeira, Huntington, NY (US); Alexander Reznik, Princeton, NJ (US); Stephen E. Terry, North Port, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 392 days.

(21) Appl. No.: 10/090,498

(22) Filed: Mar. 4, 2002

(65) Prior Publication Data

US 2002/0110099 A1 Aug. 15, 2002

Related U.S. Application Data

(63) Continuation of application No. 09/775,969, filed on Feb. 2, 2001.
(60) Provisional application No. 60/180,402, filed on Feb. 4, 2000.

(51) Int. Cl.[7] ............................................. H04B 7/216
(52) U.S. Cl. ...................... 370/335; 370/328; 370/329; 370/330; 370/319; 375/130; 375/140; 375/149
(58) Field of Search ................................ 370/310, 319, 370/320, 321, 328–330, 342, 335; 375/130, 140, 149, 150, 343

(56) References Cited

U.S. PATENT DOCUMENTS

| | | | | |
|---|---|---|---|---|
| 6,078,607 A | * | 6/2000 | Monroe et al. | 375/145 |
| 6,339,612 B1 | * | 1/2002 | Stewart et al. | 375/140 |
| 6,567,461 B1 | | 5/2003 | Moon et al. | |
| 6,611,513 B1 | * | 8/2003 | ten Brink | 370/342 |

FOREIGN PATENT DOCUMENTS

| | | |
|---|---|---|
| GB | 2351422 A | 12/2000 |
| WO | WO9940698 | 8/1999 |
| WO | WO9952249 | 10/1999 |

* cited by examiner

*Primary Examiner*—Wellington Chin
*Assistant Examiner*—Raj K. Jain
(74) *Attorney, Agent, or Firm*—Volpe and Koenig, P.C.

(57) ABSTRACT

A method of using a user equipment (UE) in a wireless time division duplex communication system. Each communication burst has a unique channelization code and a midamble code which is uniquely related to the channelization code, each such midamble code being uniquely related to one or more channelization code. The UE receives communication bursts and detects each midamble code in a received communication burst. The UE determines the channelization codes related to each detected midamble based on a mapping of midamble codes to related channelization codes. The UE detects channelization codes in the received communication burst from among the determined channelization codes.

8 Claims, 5 Drawing Sheets

METHOD OF MULTIUSER DETECTION WITH USER EQUIPMENT

CROSS-REFERENCE TO RELATED APPLICATIONS

This application is a continuation of U.S. patent application Ser. No. 09/775,969, filed Feb. 2, 2001, which claims priority from U.S. Provisional Patent Application No. 60/180,402, filed Feb. 4, 2000, which applications are incorporated herein by reference.

BACKGROUND OF THE INVENTION

The present invention relates generally to wireless time division duplex using code division multiple access (TDD/CDMA) communication systems. In particular, the invention relates to determining channelization codes for use in multiuser detection in the downlink for TDD/CDMA systems.

A TDD/CDMA communication system is illustrated in FIG. 1. The system 10 has multiple base stations $12_1$ to $12_5$. Each base station $12_1$ has an associated operating area. User equipments (UEs) $14_1$ to $14_3$ in a base station's operating area communicate with that base station $12_1$. Communications transmitted from a base station $12_1$ to a UE $14_1$ are referred to as downlink communications and communications transmitted from a UE $14_1$ to a base station $12_1$ are referred to as uplink communications.

In a wireless TDD/CDMA communication system, multiple communications are sent in a shared frequency spectrum. One such system is proposed in a third generation wideband-CDMA (W-CDMA) standard. In CDMA systems, multiple communications are sent in the shared spectrum and are distinguished by channelization codes. In TDD/CDMA systems, the shared spectrum is also time divided using repeating frames having a fixed number of time slots, such as fifteen (15) time slots. Each time slot is used to transmit either only uplink or downlink communications. As a result, the communications are distinguished by both channelization codes and time slots. A single channelization code used in a single time slot is referred to as a resource unit. Based on a communications bandwidth, the communication may require one or multiple resource units. Typical data modulation schemes used in TDD/CDMA systems are quadrature phase shift keying (QPSK), binary phase shift keying (BPSK) and N Quadrature Amplitude Modulation (QAM), such as N=8, 16 or 64.

Data is transmitted in such systems using communication bursts 16. A communication burst 16 carries data in a single time slot using a single channelization code (a single resource unit). A typical communication burst 16 has a midamble 20, a guard period 18 and two data bursts 22, 24, as shown in FIG. 2. The midamble 20 separates the two data bursts 22, 24. The guard period 18 separates the communication bursts 16 to allow for the difference in arrival times of bursts 16 transmitted from different transmitters. The two data bursts 22, 24 contain the communication burst's data. The midamble 20 contains a midamble code for use in estimating the channel response between the receiver and transmitter.

Since multiple communication bursts may be transmitted in a single time slot, a receiver must be able to distinguish data from the multiple bursts. One approach to recover the received data is multiuser detection (MUD).

In MUD, a receiver recovers all communication bursts' data in a time slot, including bursts transmitted to other UEs. To recover all the bursts' data, the MUD receiver needs to know all of the channelization codes used to transmit the bursts. In the proposed TDD mode of W-CDMA, each UE $14_1$ to $14_3$ only knows which channelization and midamble codes are used for carrying information intended for it. To determine all the channelization and midamble codes, a bank of matched filters is used to detect all possible channelization/midamble combinations. The output power from each matched filter is compared to a threshold to determine whether a particular channelization/midamble combination was used. Due to the number of required matched filters, this approach has a high complexity. Additionally, if there is a high correlation between channelization codes, this approach may have poor performance. Accordingly, it is desirable to have alternate approaches for UEs $14_1$ to $14_3$ to be able to determine the active channelization codes.

SUMMARY OF THE INVENTION

A wireless time division duplex communication system using code division multiple access has a base station and user equipments. The system communicates using communication bursts. Each communication burst has a unique channelization code and a midamble code. Each midamble code is mapped to a set of at least one channelization code. For each communication burst to be transmitted in a time slot from the base station, the midamble code mapped to that burst's channelization code is determined. Communication bursts are generated and transmitted in the time slot. Each burst has the determined midamble code for its channelization code. The user equipment receives the bursts and determines each received midamble code. The user equipment determines the channelization codes of the transmitted communication bursts based on in part a result of the determining of each received midamble code.

The invention provides a method of using a user equipment (UE) in a wireless time division duplex communication system. The system uses code division multiple access and communicates using communication bursts. Each communication burst has a unique channelization code and a midamble code which is uniquely related to the channelization code, each such midamble code being uniquely related to one or more channelization code. The UE receives communication bursts and detects each midamble code in a received communication burst. The UE determines the channelization codes related to each detected midamble based on a mapping of midamble codes to related channelization codes. The UE detects channelization codes in the received communication burst from among the determined channelization codes. The UE recovers data from the received communication burst based on in part the detected channelization codes. Where all midamble codes are uniquely related to one channelization code, the UE recovers data from the received communication burst based on in part the determined channelization codes without the additional channelization code detection step.

DETAILED DESCRIPTION OF THE PREFERRED EMBODIMENT(S)

Figure 1:
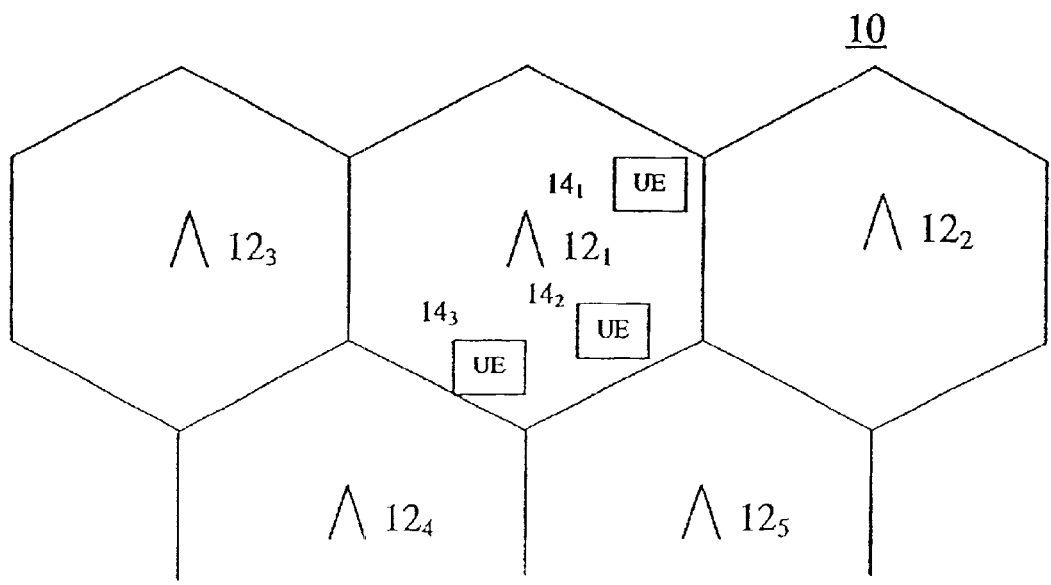
FIG. 1 is an illustration of a time division duplex/code division multiple access communication system.
Figure 2:
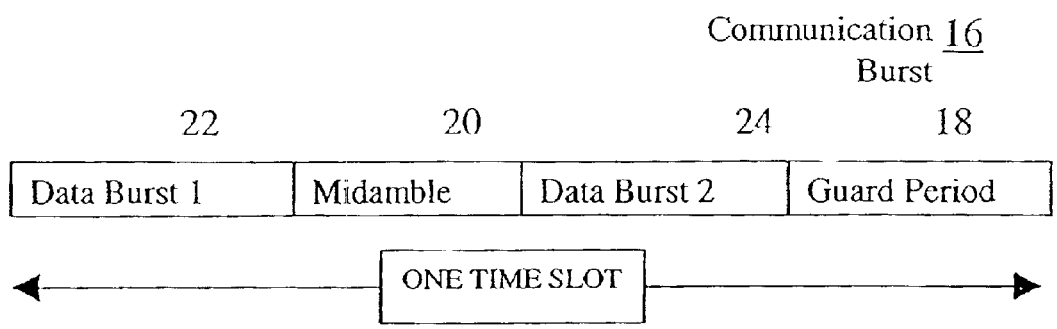
FIG. 2 is an illustration of a communication burst.
Figure 3:
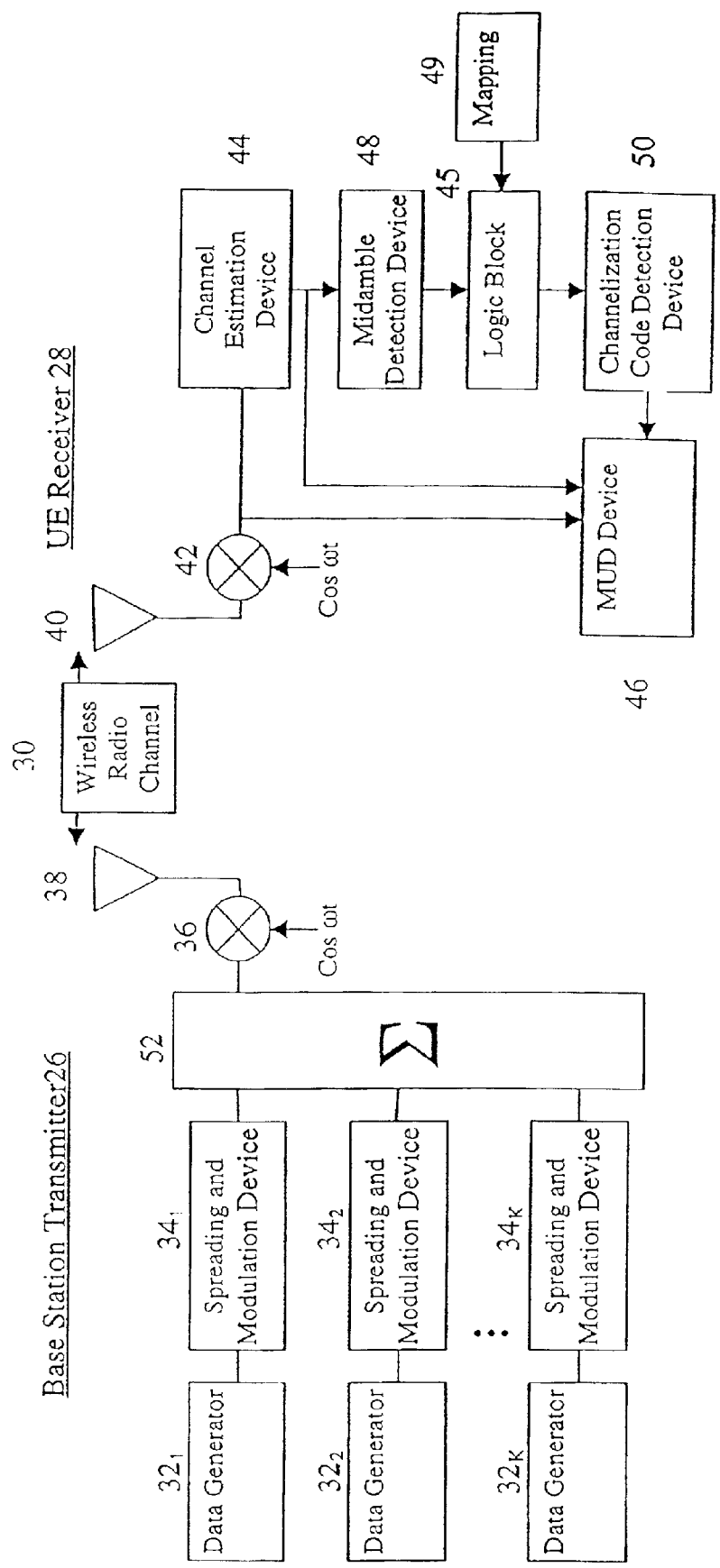
FIG. 3 is an illustration of a simplified base station transmitter and a user equipment receiver.

FIG. 3 illustrates a simplified base station transmitter 26 and a UE receiver 28 using multiuser detection (MUD). Data to be communicated to the active UEs $14_1$ to $14_3$ is produced by data generators $32_1$ to $32_K$. Each generator $32_1$ to $32_K$ produces data to be sent in a particular communication burst. Each communication burst's generated data is subsequently formatted into a communication burst by a spreading and modulation device $34_1$ to $34_K$. The spreading and modulation device $34_1$ to $34_K$ adds the midamble and spreads the generated data with a channelization code associated with that communication burst. Additionally, the spread data is time multiplexed into the appropriate time slot. All of the communication bursts are combined by a combiner 52. The combined communication bursts are modulated up to radio frequency, such as by a mixer 36, and the radio frequency signal is radiated by an antenna 38 through a wireless radio channel 30. If transmit diversity is utilized by the base station $14_1$, the radio frequency signal will be transmitted by multiple antennas.

At a UE receiver 28, radio frequency signals are received by an antenna 40. The received signals are demodulated to a baseband signal, such as by a mixer 42. A channel estimation device 44 is used to estimate the channel that the communication bursts were transmitted in using the transmitted midamble codes. A multiuser detection (MUD) device 46 processes the baseband signal using the estimated channel information and the active channelization codes to produce hard symbols.

Figure 4:
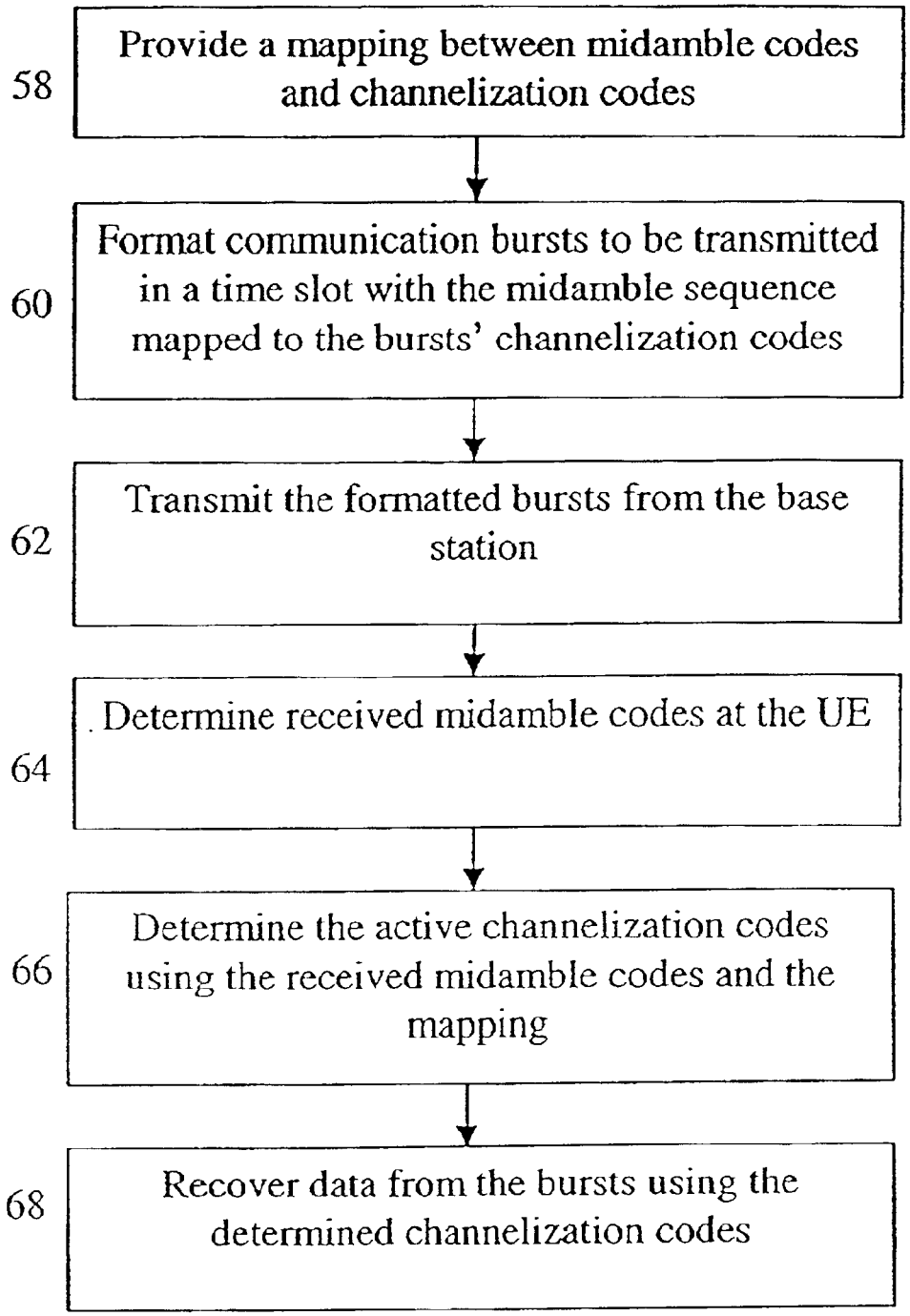
FIG. 4 is a flow chart of downlink channelization code identification.
Figure 5:
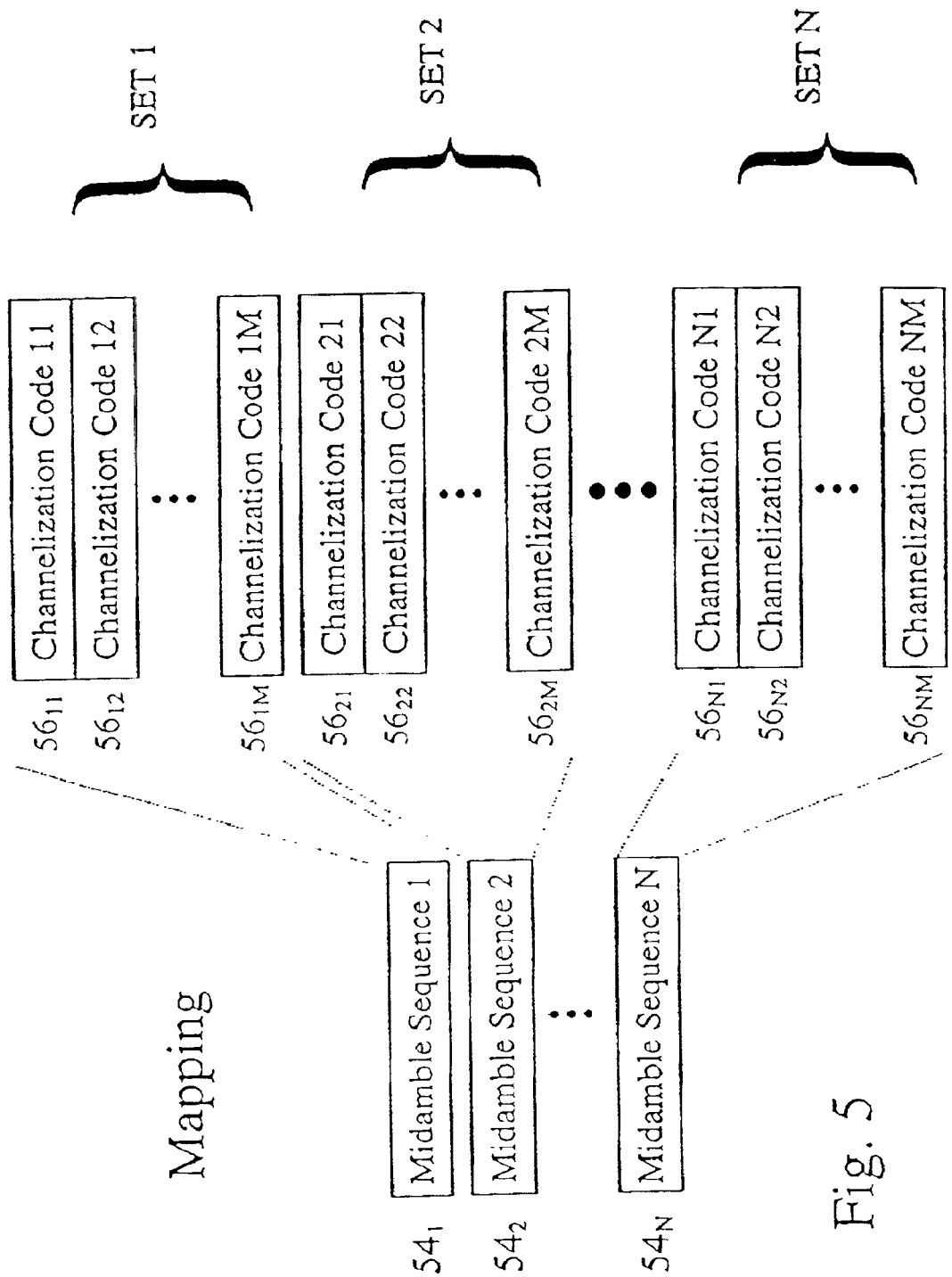
FIG. 5 is an illustration of midamble sequence to channelization code mapping.

Identifying active channelization codes is shown in the flow chart of FIG. 4. One approach to aid in identifying active channelization codes at the UE $14_1$ is to provide a mapping between midamble codes (midamble sequences) $54_1$ to $54_N$ and channelization codes $56_{11}$ to $56_{NM}$, 58. Each midamble sequence $54_1$ to $54_N$ is associated with a set of channelization codes $56_{11}$ to $56_{NM}$, as illustrated in FIG. 5. The sets may contain only a single channelization code, which is a one to one mapping of midambles to channelization codes. A burst transmitted by the base station $12_1$ with a channelization code of a midamble's set is formatted with that midamble sequence, 60, 62. To illustrate, if a burst with channelization code 21 was sent, midamble sequence 2 is used for that burst.

At the UE receiver 28, after channel estimation, the transmitted midamble sequences are detected by a midamble sequence detection device 48, 64. Based on the detected midambles, a logic block 45, utilizing the midamble to channelization code mapping 49, determines the set of possible channelization codes. A channelization code detection device 50 determines the received channelization codes based on the determination, 66. If a one midamble code to one channelization code mapping is used, the logic block 45 determines the channelization codes. As a result, for a one to one mapping, the channelization code detection device 50 is not used. The MUD device 46 uses the determined channelization codes and the channel response for the midamble sequences associated with the channelization codes to detect the data from all the bursts, 68.

Figure 6:
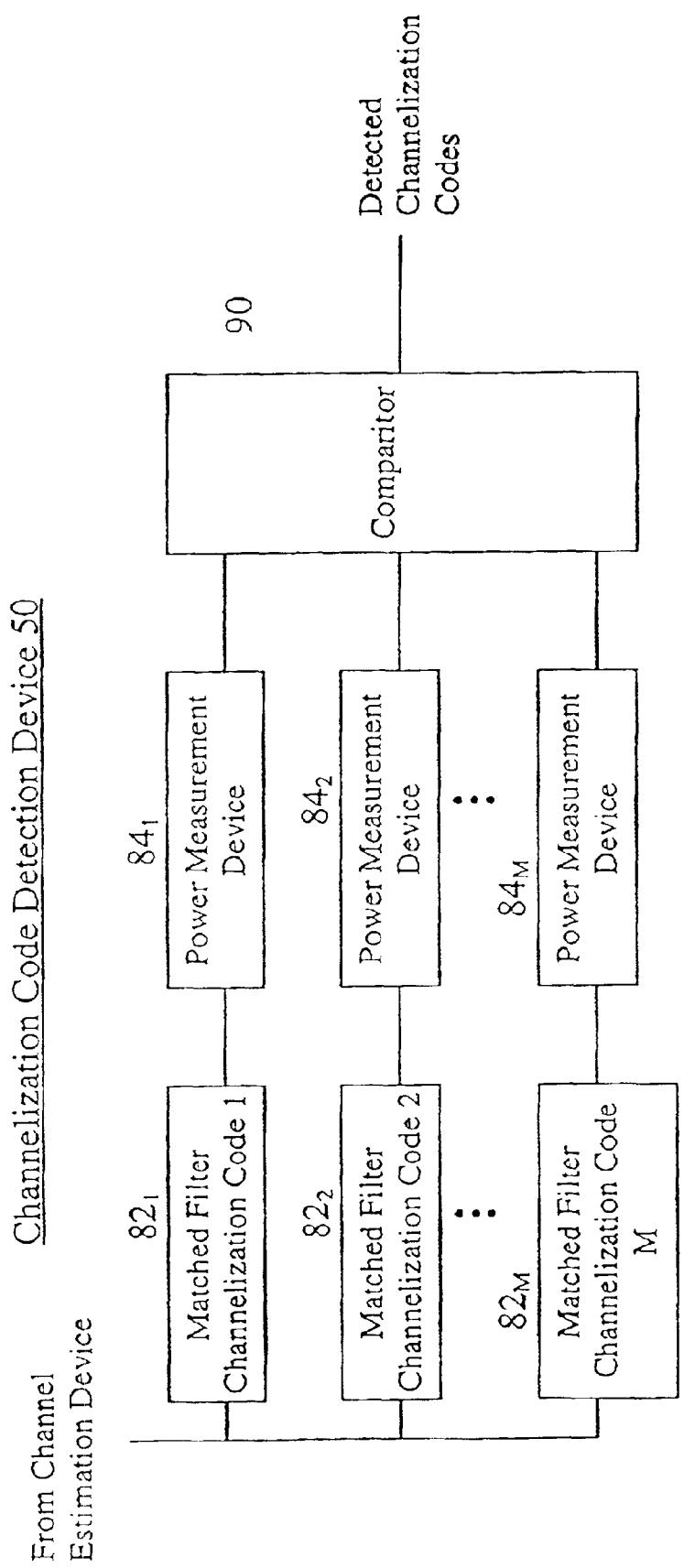
FIG. 6 is a channelization code detection device.
Figure 6:
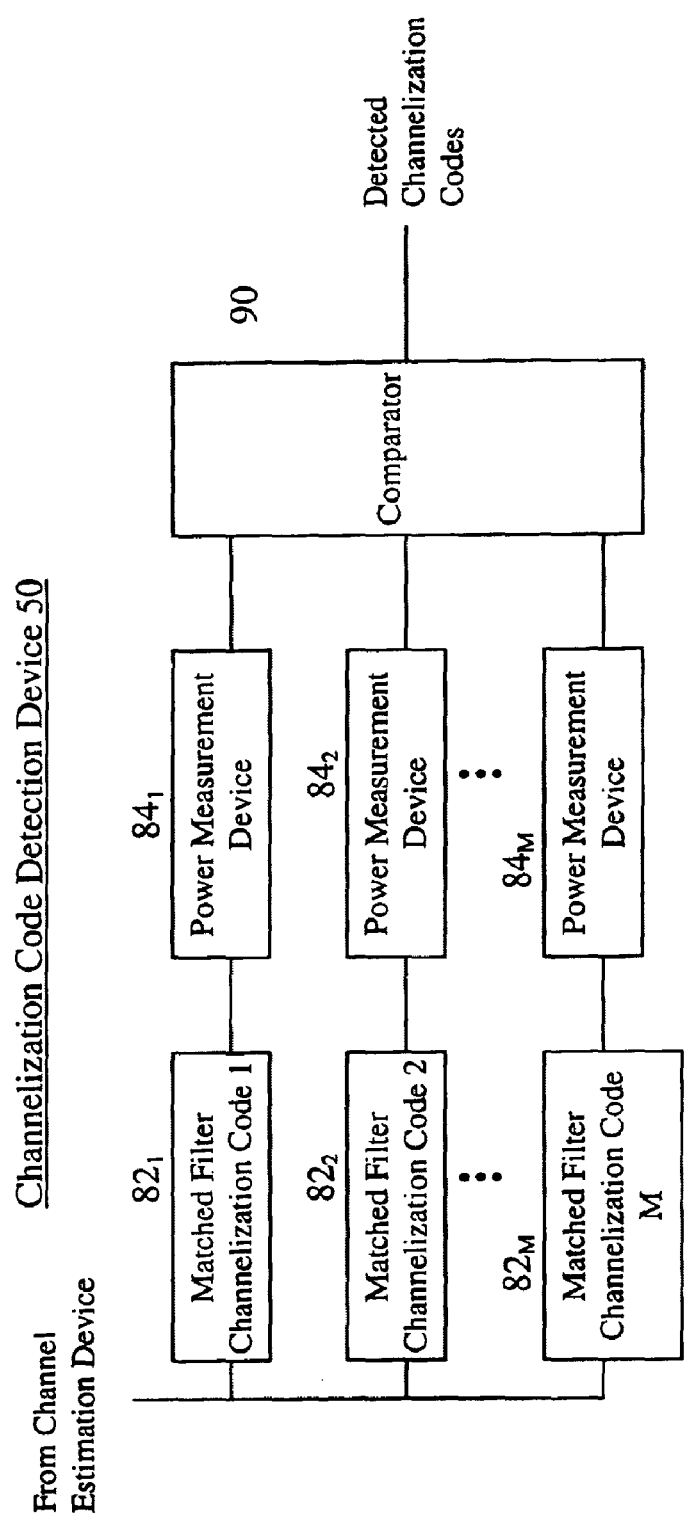

One channelization code detection device 50 is shown in FIG. 6. Matched filters $82_1$ to $82_M$ are matched to the possible channelization codes and associated channel responses as determined by the logic block 45. Since only the possible channelization codes need to be checked, the number of matched filters $82_1$ to $82_M$ is greatly reduced, reducing the complexity and improving the performance of the receiver 28. The power of the soft symbols produced by each matched filter $82_1$ to $82_M$ is measured by corresponding power measurement devices $84_1$ to $84_M$. The comparitor 80 determines the received channelization codes based on the power measurement for each channel. If the number of transmitted channelization codes is known, the comparitor 80 selects that number of channels with the highest measured power. Otherwise, the comparitor 80 compares each channel's power level to a threshold to determine the transmitted channelization codes.

To aid in identifying channelization codes, channelization code information, such as transmitted channelization codes or a number of transmitted channelization codes, may be signaled to the UE $14_1$. The signaled information can be used in conjunction with channelization/midamble code mapping or when mapping is not used. The additional channelization code information will increase the accuracy in determining the active channelization codes at the UE receiver 28. One such signal would be a layer one signal, where the midamble code or midamble code shift is associated with the information. The midamble detection device 48 determines the received midamble code(s) and the logic block 45 recovers the channelization code information using the determined midamble codes. Using the recovered information, the channelization code detection device 50 uses the recovered information to aid in the channelization code determination. Another approach signals channelization code information using a layer 2/3 signal. The signal is generated by the network circuitry. The layer 2/3 signal can be used in conjunction with layer one signals or with the midamble/channelization code mapping.

What is claimed is:

1. A method of using a user equipment (UE) in a wireless time division duplex communication system using code division multiple access, where the system communicates using communication bursts, each communication burst having a unique channelization code and a midamble code which is uniquely related to the channelization code, each such midamble code being uniquely related to one or more channelization codes, the method comprising:

receiving communication bursts by the UE;

detecting each midamble code in a received communication burst;

determining the channelization codes related to each detected midamble based on a mapping of midamble codes to related channelization codes;

detecting channelization codes in the received communication burst from among the determined channelization codes; and recovering data from the received communication burst based on in part the detected channelization codes.

2. The method of claim 1 wherein channelization code detection comprises match filtering the received burst for each determined channelization code to produce a filtered signal corresponding to each determined channelization code, measuring the power of each filtered signal produced and comparing the power measurements.

3. The method of claim 2 wherein the channelization code detection compares the power measurements to a predetermined threshold whereby a determined channelization code is detected if the power measurement of the filtered signal associated with matched filtering for that determined channelization code exceeds the threshold.

4. The method of claim 1 further comprising using received midambles of received bursts for producing channel estimations of the received bursts wherein the channel estimation of a received burst is used for the midamble detection, the channelization code detection and the data recovery.

5. The method of claim 4 wherein channelization code detection comprises match filtering the received burst for each determined channelization code to produce a filtered signal corresponding to each determined channelization code, measuring the power of each filtered signal produced and comparing the power measurements.

6. The method of claim 5 wherein the channelization code detection compares the power measurements to a predetermined threshold whereby a determined channelization code is detected if the power measurement of the filtered signal associated with matched filtering for that determined channelization code exceeds the threshold.

7. A method of using a user equipment (UE) in a wireless time division duplex communication system using code division multiple access, where the system communicates using communication bursts, each communication burst having a unique channelization code and a midamble code which is uniquely related to the channelization code, each such midamble code being uniquely related to one channelization code, the method comprising:

receiving communication bursts by the UE;

detecting each midamble code in a received communication burst;

determining the channelization codes related to each detected midamble based on a mapping of midamble codes to related channelization codes; and recovering data from the received communication burst based on in part the determined channelization codes.

8. The method of claim 7 further comprising using received midambles of received bursts for producing channel estimations of the received bursts wherein the channel estimation of a received burst is used for the midamble detection and the data recovery.

* * * * *

UNITED STATES PATENT AND TRADEMARK OFFICE
CERTIFICATE OF CORRECTION

PATENT NO. : 6,885,649 B2
DATED : April 26, 2005
INVENTOR(S) : Zeira et al.

It is certified that error appears in the above-identified patent and that said Letters Patent is hereby corrected as shown below:

Delete Drawing Sheet 5 and substitute therefor the Drawing Sheet consisting of Fig. 6 as shown on the attached page.

<u>Column 4,</u>
Line 5, after the word "The", delete "comparitor" and insert therefor -- comparator --.
Lines 8 and 10, after the word "the", delete "comparitor" and insert therefor
-- comparator --.

Signed and Sealed this

Twenty-third Day of August, 2005

JON W. DUDAS
*Director of the United States Patent and Trademark Office*